US009874042B2

(12) United States Patent
Gartner

(10) Patent No.: US 9,874,042 B2
(45) Date of Patent: Jan. 23, 2018

(54) METHOD AND DEVICE FOR INPUTTING AN ACCESS CODE IN AN ELECTRONIC COMBINATION LOCK

(71) Applicant: Klaus W. Gartner, Palos Verdes Estates, CA (US)

(72) Inventor: Klaus W. Gartner, Palos Verdes Estates, CA (US)

(73) Assignee: Klaus W. Gartner, Palos Verdes Estates, CA (US)

(*) Notice: Subject to any disclaimer, the term of this patent is extended or adjusted under 35 U.S.C. 154(b) by 105 days.

(21) Appl. No.: 14/708,759

(22) Filed: May 11, 2015

(65) Prior Publication Data

US 2016/0298362 A1 Oct. 13, 2016

Related U.S. Application Data

(60) Provisional application No. 62/144,563, filed on Apr. 8, 2015.

(51) Int. Cl.

| | |
|---|---|
| ***G05B 23/02*** | (2006.01) |
| ***E05B 41/00*** | (2006.01) |
| ***E05B 47/02*** | (2006.01) |
| *E05B 47/00* | (2006.01) |

(52) U.S. Cl.

CPC ............ *E05B 41/00* (2013.01); *E05B 47/026* (2013.01); *E05B 47/0003* (2013.01); *E05B 2047/0062* (2013.01)

(58) Field of Classification Search

CPC ........ E05B 49/00; E05B 41/00; E05B 47/026; E05B 47/0003; E05B 2047/0062

USPC ........................................................ 340/5.55

See application file for complete search history.

(56) References Cited

U.S. PATENT DOCUMENTS

| | | | |
|---|---|---|---|
| 3,754,213 A | 8/1973 | Morroni et al. | |
| 4,631,940 A | 12/1986 | Krivec et al. | |
| 4,779,090 A * | 10/1988 | Micznik | G07C 9/00111 340/13.25 |
| 5,517,184 A * | 5/1996 | Miller | E05B 37/00 340/5.28 |

(Continued)

OTHER PUBLICATIONS

International Search Report and Written Opinion, issued by the ISA/U.S. Receiving Office, regarding corresponding patent application Serial No. PCT/US2015/046530; dated Nov. 24, 2015; 8 pages.

*Primary Examiner* — Naomi Small

(74) *Attorney, Agent, or Firm* — Fox Rothschild LLP

(57) ABSTRACT

A method of gaining authorized entry into a secure location is provided. The method includes providing an electronic lock having a dial, the lock operably coupled to a microprocessor having memory for storing a user input code and a valid code. The user rotates the dial to activate power to the lock and a first random character is generated. The user again rotates the dial until a first user input character displays in the display. The first user input character is stored in memory and a second random character is generated. After the user has entered all characters of the access code, the microprocessor compares the user input characters with the valid access code stored in memory if the user inputted code comprises an authorized code an indicia is generated on the display to visually indicate to a user that the lock is capable of moving to the opened position.

15 Claims, 6 Drawing Sheets

(56) References Cited

U.S. PATENT DOCUMENTS

| | | | | |
|---|---|---|---|---|
| 5,896,095 | A * | 4/1999 | Hill | G07C 9/00658 340/5.2 |
| 6,076,383 | A | 6/2000 | Clark et al. | |
| 6,442,983 | B1 * | 9/2002 | Thomas | E05B 47/0012 70/278.1 |
| 6,737,956 | B1 * | 5/2004 | Kimura | B62H 5/20 340/5.5 |
| 6,741,160 | B1 * | 5/2004 | Dawson | G07C 9/00666 340/5.2 |
| 2009/0078008 | A1 * | 3/2009 | Gartner | G07C 9/00142 70/3 |
| 2010/0180649 | A1 * | 7/2010 | Harvey | E05B 37/00 70/277 |
| 2011/0162420 | A1 | 7/2011 | Lee | |

* cited by examiner

METHOD AND DEVICE FOR INPUTTING AN ACCESS CODE IN AN ELECTRONIC COMBINATION LOCK

CROSS REFERENCE TO RELATED APPLICATIONS

This application claims priority to U.S. provisional patent application Ser. No. 62/144,563, filed on Apr. 8, 2015, the entirety of which is hereby incorporated by reference.

BACKGROUND OF THE INVENTION

1. Field of the Invention

The present invention relates to locks having electronic input means and methods of inputting lock combinations, primarily for safes and other secure containers.

2. Description of the Related Art

Safes and other secure containers have traditionally used combination locks for controlling and authorizing entry. Locks had been mechanical and relied on a person dialing a correct combination on a rotating dial. The rotation positioned mechanical elements within the lock such that dialing the correct combination allowed a locking bolt to release the container door. For example, traditional mechanical locks, such as Gartner, U.S. Pat. No. 3,968,667 (1976), rely on a dial rotating tumblers. Proper dial rotation aligns gates in the tumblers. Once the gates are aligned, a fence on a fence lever can enter the aligned gates. Continued rotation of the dial and tumblers pulls the fence lever and withdraws the bolt.

Electronics have replaced mechanical structures in many locks. Electronic locks can use electronics rather than aligned tumbler wheels to sense entry of the correct combination. The electronics can sense the rotary position of a combination lock dial, or a keypad can replace the combination dial. Consequently, instead of dialing a number, e.g., "72," the user would first push the "7" and then the "2" keys for the same result. Uyeda, U.S. Pat. No. 5,134,870 (1992) and Gartner, U.S. Pat. No. 5,136,870 (1992) are examples of a keypad entry system for a safe and door lock, respectively.

When the lock is used to secure entry to a container, the electronic components are typically mounted on a housing inside the container door. The housing contains a battery and a circuit board, which contains the electronic circuitry controlling the lock. The keypad is on the outside of the housing so as to be accessible to the user. A cable typically extends between the keypad and the circuit board for transmitting signals between the two components.

Traditional electronic keypads generally include ten keys that correspond with the numbers "0" through "9." One drawback of this type of traditional keypad design arises from the fact that as users repeatedly enter the correct, authorized access combination on the keypad, the keys representing correct numbers in the combination begin to show signs of visible wear. As a result, an unauthorized individual may figure out the correct access combination. To prevent this, the combination must periodically be changed such that each of the keys on the keypad are used at some point in time and, as a result, all keys show signs of wear. However, having to periodically change the correct, authorized access combination may create confusion for authorized users who must repeatedly remember new combinations.

Another drawback to traditional electronic locks having a display is that as the user enters the correct, authorized access combination, the access code may be visible to unauthorized users who thereafter may access the safe.

Thus, there is a need for an improved access combination system and method that may be accessed by a user while preventing unauthorized entry and maintaining a high level of security.

SUMMARY OF THE INVENTION

The present invention solves the foregoing problems by providing a method of inputting a user access combination in order to gain authorized entry into a secure location. The present invention provides an electronic lock assembly comprising a housing, an input dial, and a microprocessor in communication with the input dial. The housing includes a front wall, a rear wall, and a generally cylindrical side wall disposed between the front and rear walls. The rear wall of the housing is attachable to a secure container. The dial is attachable to the front wall of the housing. The lock also includes a top-reading display. The display displays user input characters and randomly generated characters. The microprocessor has memory for storing the user input characters and the randomly generated characters. The microprocessor may also be configured to control operation of a latch mechanism, wherein the latch mechanism is movable from a locked position to an unlocked position upon the microprocessor determining that a valid or correct access combination has been input through the dial.

A method of inputting an authorized access code is also provided. In one aspect of the inventive method, the sequence begins when the rotatable dial is turned in a clockwise or counter-clockwise direction. If the super capacitor is fully charged it activates and turns on the display. As a result, a randomly generated number or other symbol is shown on the display.

Next, the user rotates dial in a clockwise or counter-clockwise direction in order to change the numerical value displayed in display to the first character or number of the user input code.

During a pre-determined period of time, typically one to four seconds, the user input character is stored in RAM, the display blinks and a second random character is generated and displayed in display. Those of skill in the art will appreciate that the user does not have the option of changing the first user input character to select a different character after the random character is generated.

The method continues when the user again rotates dial clockwise or counter-clockwise until the second user input number is displayed in display. The process discussed above is repeated during the pre-determined period of time, typically one to four seconds, while the second character input by the user is stored in RAM and a third random character is generated and displayed in display.

This process is repeated until the entire user input code is input into the lock. Typically this will be three characters. However, while a two-digit code is used here for purposes of illustration, those of skill in the art will appreciate that an access code may comprise three integers or digits or may comprise any number of digits. After all user input characters are inputted, the microprocessor compares the user inputted access code stored in RAM with the valid access code stored in ROM to determine if the codes match. If the user inputted access code matches the correct stored access code, the display provides a visual indication to the user, such as "OP" or "+" to indicate that the lock is ready to be opened. In addition, and depending on the lock being used the microprocessor may send a signal to a latch or bolt drive indicating that authorized entry has been confirmed, thereby allowing the latch or other bolt to be retracted into to the open position by a user. The user will then turn the dial to the right to cause the latch or bolt to disengage from the container or safe door. In another aspect of the invention, the display may provide a visual indication to the user, such as "NOP" or "–" or "00" indicating that the correct access code has not been entered and the lock is not opened. If a valid access code has not been input by the user the device powers off.

These and other aspects of the invention will now be described in detail with reference to the accompanying Figures.

DETAILED DESCRIPTION OF THE INVENTION

Figure 1:
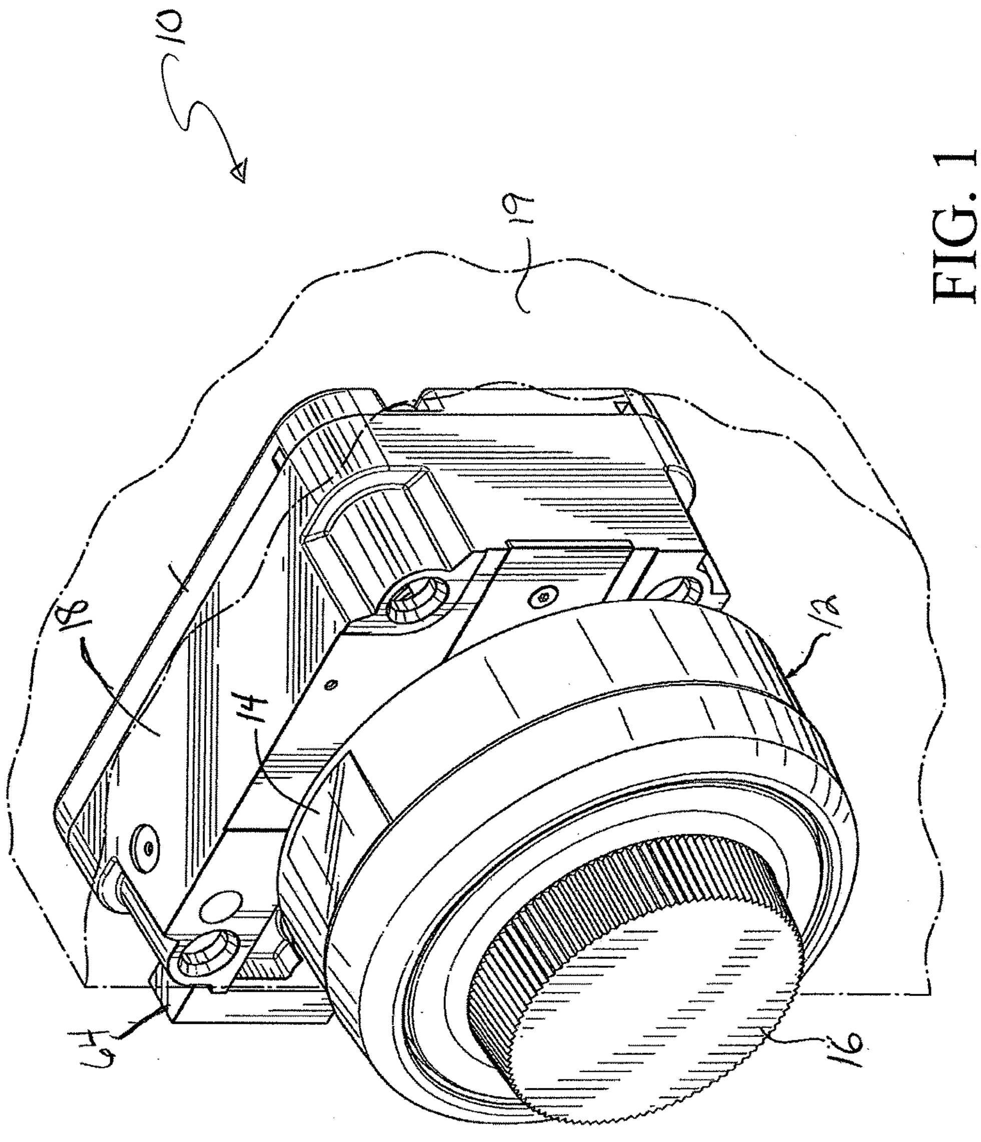
FIG. 1 is a perspective view of an electronic lock according to the present invention.

Referring now to the drawings and as best seen in FIG. 1, a device 10 for preventing unwanted opening of a locked enclosure according to a preferred embodiment of this invention has an external user-accessible housing 12 conveniently provided with a display 14 and a manually rotatable input knob or dial 16 for dialing the access code. Housing 12 is attached to the casing 18 by means known to those of skill in the art. Housing 12 is shown as being generally cylindrical in shape, although numerous other shapes are also contemplated. Typically, casing 18 is attached to the back side of a door 19 disposed between the housing 12 and the casing 18 while the housing 12 is mounted on the outside of the door for easy access for a user. The door 19 of the container or safe typically will include a door handle (not shown), which may be grasped and turned for opening the safe when a locking latch mechanism or similar device is retracted from a closed position to an open position as will be explained in more detail to follow.

Figure 2:
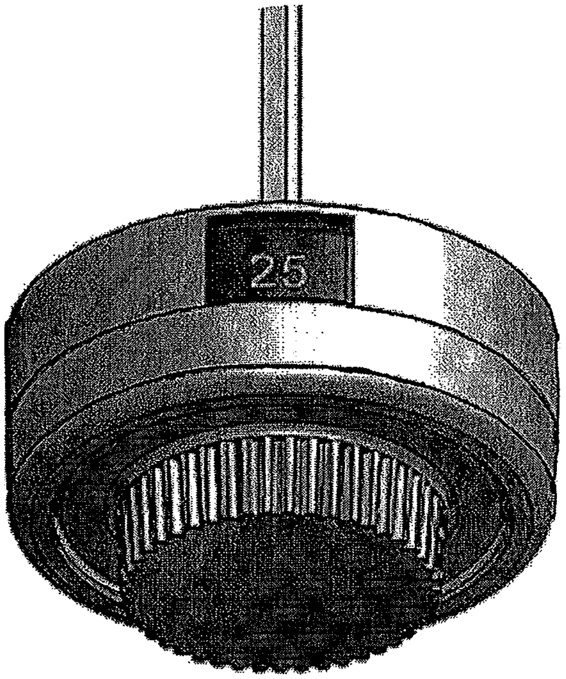
FIG. 2 is a front perspective view of one embodiment of the electronic lock according to the invention showing the top reading display showing a first character having been entered by a user.
Figure 3:
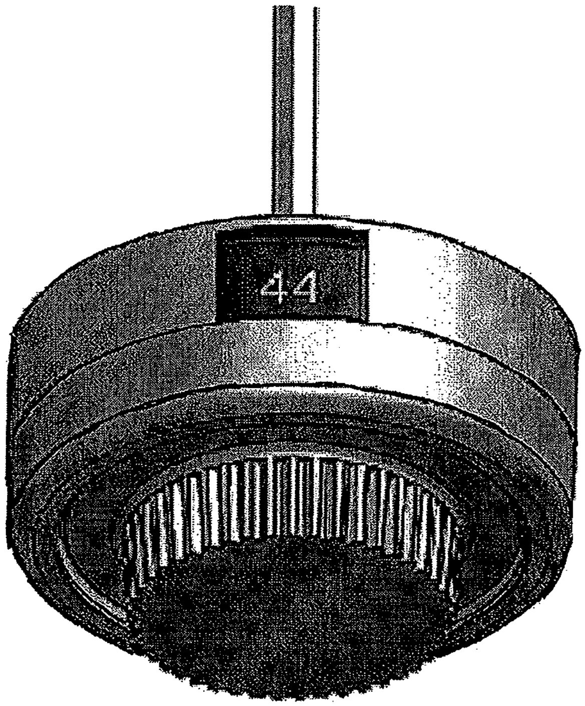
FIG. 3 is a front perspective view of an embodiment of the electronic lock according to the invention showing the top reading display showing a randomly generated character generated by the lock.
Figure 4:
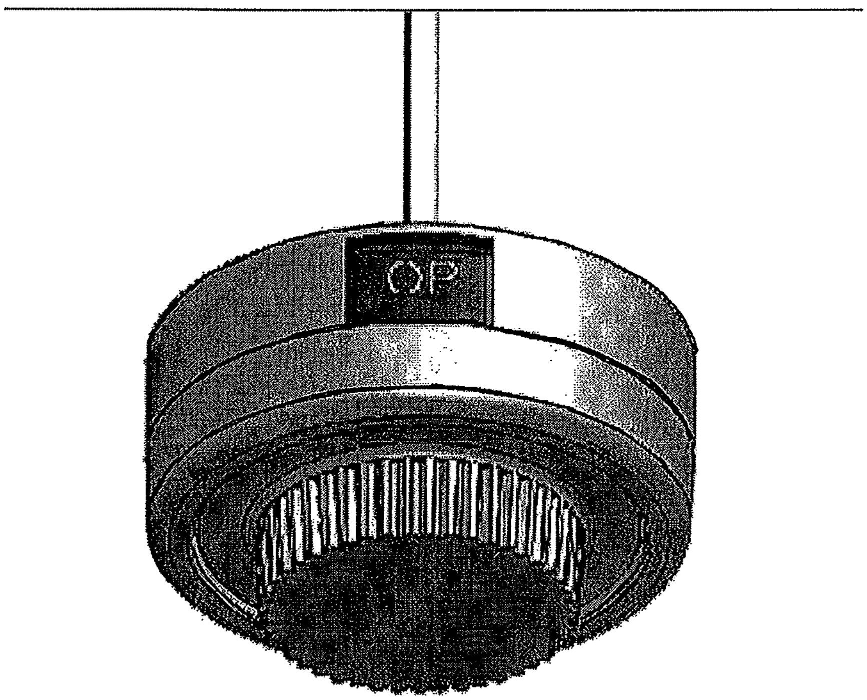
FIG. 4 is a front perspective view of an embodiment of the electronic lock according to the invention showing the top reading display showing a visual indicia that the lock is open after a valid access code has been verified.

Display 14 is shown as being flush with housing 12 but in other embodiments it may be recessed in housing 12. The display 14 functions to display first, second, and third (or more) characters. The display may be configured to display, for example, numerical values between "0" and "9." In other embodiments, display 14 may be configured to display two digit numerical values. For example as shown in FIG. 2 display 14 is displaying the number "25," while in FIG. 3 the display 14 is displaying the number "44." In other embodiments, the display may be configured to display letters, symbols, or many other types of characters. For example, in FIG. 4 display 14 displays letters "OP" indicating that the correct access code has been entered and the lock is now ready to be opened by a user. Those of skill in the art will appreciate however that symbols, such as "+", may also be used to provide a visual indication to a user that the correct access code has been entered. Similarly, if an incorrect access code has been entered a symbol such as "–" may be displayed or the letters "NO" or "NOP" may be displayed or the numbers "00" may be displayed.

Housing 14 of electronic lock 10 may be constructed from numerous materials. However, the material will typically be a metal, such as brass or stainless steel, but can also be plastic. Furthermore, the outer surfaces of housing 14 may be chrome-plated or painted, or the unplated metal surface can be polished or brushed for aesthetics. Casting may be a preferred way of forming the housing.

Figure 5:
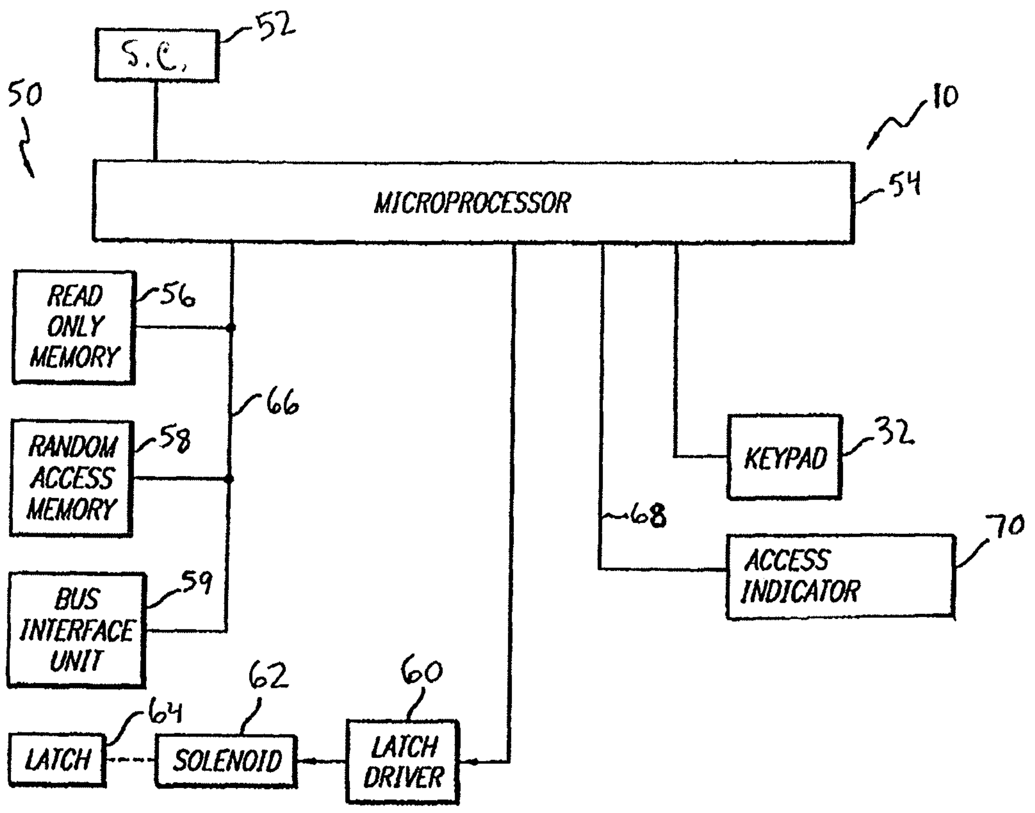
FIG. 5 is a block diagram of various components of an electronic lock in accordance with the invention.
Figure 6:
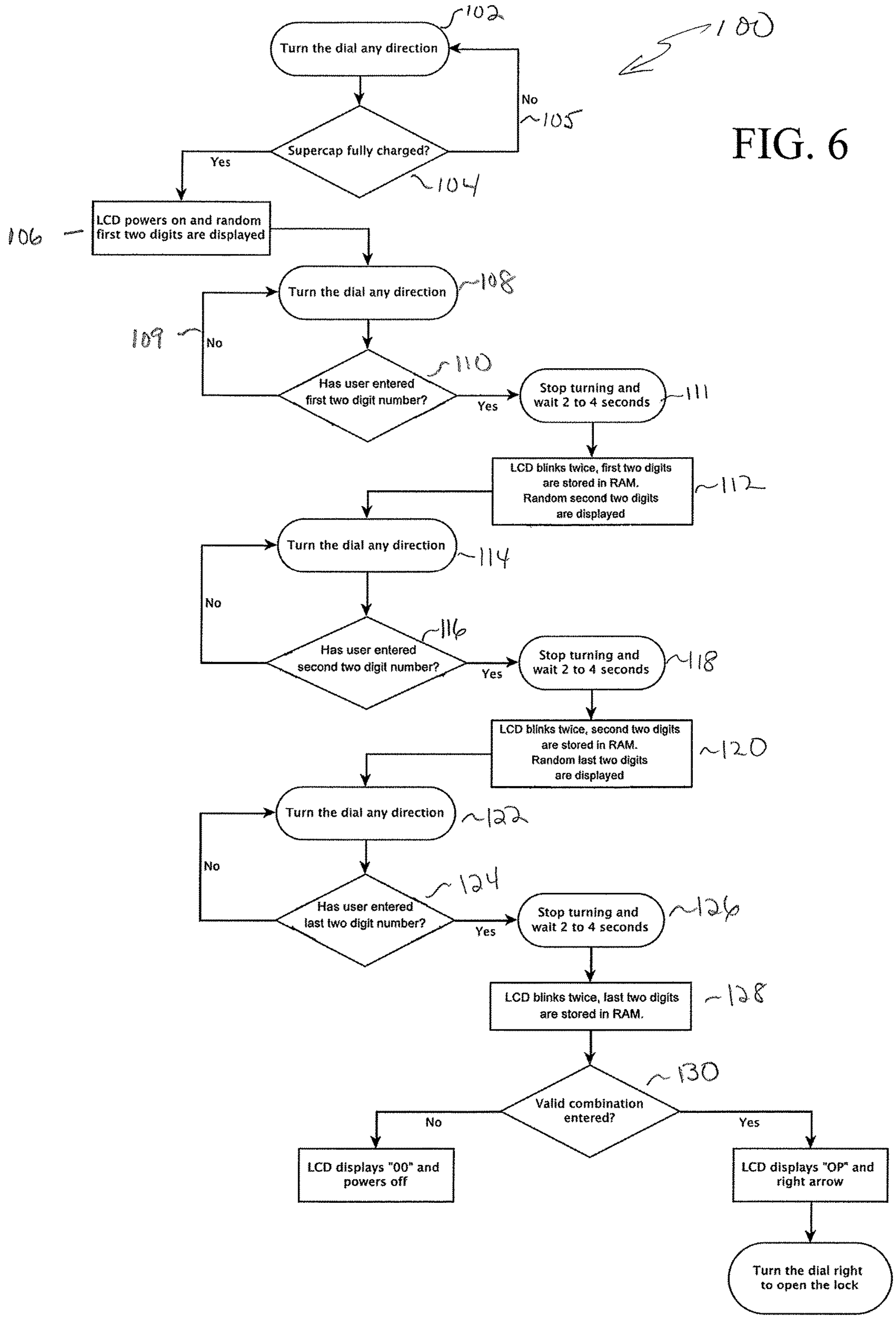
FIG. 6 is a flowchart of one embodiment of an input method for an electronic lock according to the present invention.

FIG. 5 illustrates a block diagram of electronic lock 10 detailing various control components and the data communication between those components. In particular, as shown in FIG. 6, electronic lock 10 is controlled by electronic logic circuit 50, which is powered by super capacitor 52. Logic circuit 50 generally includes microprocessor 54, read only memory (ROM) 56, random access memory (RAM) 58, interface unit 59, latch driver 60, and solenoid 62. Logic circuit 50 is responsive to a coded input signal entered via input dial 16 mounted to housing 12 as the dial in rotated to a correct access number. In particular, logic circuit 50 causes a solenoid plunger or latch 64 to move between closed and open positions when the coded input signal is received via a user entering a correct access code from dial 16.

The ROM 56 has at least one correct access code stored therein which must be retrieved for comparison purposes with the access code entered by the user via dial 16. The RAM 58 is coupled between microprocessor 54 and interface unit 59 via a common data bus 66, and is configured for receiving and storing the user input access code.

In order to enable microprocessor 54 to control operation of latch or bolt 64, latch driver 60 is coupled between microprocessor 54 and solenoid 62. Solenoid 62 is configured to move latch 64 between closed and open positions whenever microprocessor 54 sends an actuation signal to latch driver 60. The operation of latch driver 60 and solenoid 62 is known to those skilled in the art and such operation will not be described in greater detail. In one embodiment, latch driver 60 is a solenoid driver. However, it is contemplated that other types and kinds of driver, such as a motor driver, may be employed.

In one aspect of the electronic lock 10 in accordance with the invention, whenever the user enters the correct access code, microprocessor 54 will generate a pulsed correct indication signal on conductor path 68 that causes an access indicator 70 to indicate that the correct access code has been entered. Similarly, whenever the user enters an incorrect access code via dial 16, microprocessor 54 will generate an incorrect indication signal on conduction path 68 that causes access indicator 70 to indicate that an incorrect access code has been entered. It is contemplated that access indicator 70 is operably coupled to display 14 to display a visual indication that the correct (or incorrect) access code has been entered. In other embodiments, the electronic lock 10 does not include a display 14 or an access indicator 70, and the user simply attempts to open door 19 after entering the access code. In that case, when the user enters the correct access code, latch 64 will retract to the open position providing an audible signal to the user, thereby allowing the user to open door 19. However, if the user input access code does not match the correct access code, latch 64 will remain in the closed position, and the user will be unable to open door 14.

In another aspect of the invention, whenever the user enters a correct number that is part of the correct access code, microprocessor 54 will generate a correct indication signal on conductor path 68 that causes an access indicator 70 to indicate that the correct number of the access code has been entered. This may be displayed on display 14 or no symbols or letters are displayed until the entire correct access code is entered.

In one embodiment of device 10, when latch 64 is actuated to the open position, latch 64 remains retracted for a sufficient period of time to permit the user to open door 14 but not a sufficient period of time to permit the user to lock door 14 once it has been opened. In that case, the user must reenter the correct access code to enable door 14 to be once again locked in a closed position. However, in other embodiments, the above-mentioned period of time may be adjusted such that opening and closing door 14 may be accomplished by entering the correct access code only once.

It is also contemplated that latch 64 may be in a normally open position instead of a normally closed position. Thus, the operation to cause latch 64 to be extended to the closed position for locking door 14 may be accomplished in substantially the same manner as described above for causing latch 64 to be retracted to the open position for unlocking door 14.

The present invention has been described as having a latch 64 for locking door 14. However, those of skill in the art will appreciate that rotary bolts and other types of latching means may be substituted and are contemplated to be within the scope of the invention.

Now that a brief description of the electronic lock in accordance with the invention has been provided, a method of input for the lock according to the present invention will be described in detail. In particular, FIG. 6 illustrates a flowchart of a sample control logic sequence of an input method 100 according to the present invention. In particular, input method 100 will be described with reference to lock 10.

The sequence begins at step 102 when dial 16 is turned in the clockwise or counter-clockwise direction to power-up electronic lock 10. The microprocessor senses the voltage of the super capacitor at step 104. If the super capacitor is fully charged, the lock 10 is activated and display 14 powers on in step 106. As a result, a randomly generated two-digit number or other symbol is shown on display 14.

Next, in steps 108, 110, the user rotates dial 16 in either the clockwise or counter-clockwise direction in order to change the numerical value displayed in display 14 to the first number in the access code being input by the user. During a two to four second delay 111, the microprocessor stores the first two-digit number entered by the user in RAM 58. After storing the number in RAM 58, the display will generate a symbol or blink once or twice indicating to the user that the number has been stored at step 112. As a result a second random two-digit number will be displayed on the display 14.

The method continues at steps 114, 116 where the user again rotates dial 14 in the clockwise or counter-clockwise direction until the second two-digit number in the access code being input by the user is displayed on display 14. The user then stops turning the dial 16 and during a two to four second delay the microprocessor stores the second two-digit number input by the user into RAM 58, the display blinks once or twice and then generates a third random two digit number which displays in the display 14.

The method continues at steps 122, 124 where the user again rotates dial 14 in the clockwise or counter-clockwise direction until the third two-digit number in the access code being input by the user is displayed on display 14. The user then stops turning the dial 16 and during a two to four second delay 126 the microprocessor stores the third two-digit number input by the user into RAM 58, the display blinks once or twice at step 128.

At step 130, microprocessor 54 compares the user input access code stored in RAM 58 with the correct access code stored in ROM 56 to determine if the codes match. If the user input access code matches the valid access code in ROM 56, the display 14 provides a visual indication to the user, such as "OP" or "+" to indicate that the lock 10 is open with a right arrow in the display indicating that the user may turn the dial to the right to open the lock. Depending on the type of lock or bolt involved microprocessor 54 may also a signal to latch drive 60 indicating that authorized entry has been confirmed, thereby retracting or otherwise moving latch 64 to the open position in order to allow the user to open door 14.

Although method 100 has been described with reference to a display configured to display a two digit number, one skilled in the art will appreciate that the input method according to the present invention may be modified for use with a display that may be configured to display any quantity of numbers, letters, symbols, or other characters. In one aspect of the invention, the correct access code is formed by three two-digit numbers. In other aspects of the invention, the correct access code is formed by more than three numbers and those numbers may be single digits. Furthermore, the total quantity of numbers that form the correct access code may be either odd or even.

Although the present invention has been described with reference to preferred embodiments, workers skilled in the art will recognize that changes may be made in form and detail without departing from the spirit and scope of the invention.

What is claimed is:

1. A method of gaining authorized entry into a secure location, the method comprising:

providing an electronic lock including a housing, a display and a rotatable dial, said electronic lock operably coupled to a microprocessor having memory for storing a user input code and a valid access code;

turning said dial to supply power to the electronic lock;

generating a first random two-digit character displayed in the display;

rotating said dial in either a clockwise or counter-clockwise direction until a first user two-digit input character displays in said display;

after a first pre-determined period of time, storing said first user two-digit input character in memory, generating a second two-digit random character displayed in the display thereby automatically preventing changing the first user two-digit input character after the second two-digit random character displays in the display;

rotating said dial in either a clockwise or counter-clockwise direction until a second user two-digit input character displays in said display;

after a second pre-determined period of time, storing said second user two-digit input character in memory, generating a third two-digit random character displayed in the display thereby automatically preventing changing the second user two-digit input character after the third two-digit random character displays in the display;

rotating said dial in either a clockwise or counter-clockwise direction until a third user two-digit input character displays in said display;

after a third pre-determined period of time storing said third user two-digit input character in memory thereby automatically preventing changing the third user two-digit input character after the third pre-determined period of time;

causing said microprocessor to compare the first, second and third user two-digit input characters with the valid access code stored in memory to determine whether the inputted first, second and third user two-digit characters comprise an authorized code and if so;

generating an indicia on the display to visually indicate to a user that the lock is capable of moving to an unlocked position.

2. The method of claim 1, wherein said first, second and third user inputted characters and said first, second and third randomly generated characters are alphanumeric characters.

3. The method of claim 2, wherein the alphanumeric characters are integers.

4. The method of claim 3 wherein the integers are two digit integers.

5. The method of claim 3 wherein the integers are in a range from 0 to 9.

6. The method of claim 1, further comprising the step of moving a lock mechanism from a locked position to an unlocked position upon confirming that the user input access code matches the authorized access code.

7. The method of claim 1 wherein the valid access code comprises a three character code, each character including two digits.

8. The method of claim 1 further comprising generating an indicia on the display to visually indicate to a user that the first, second and third user input characters do not match the valid access code stored in memory if the microprocessor determines that the first, second and third user input characters do not match the valid access code stored in memory.

9. The method of claim 8 further comprising powering down the device.

10. An electronic lock comprising:

a housing having a front wall, a rear wall, and a generally cylindrical side wall disposed between the front and rear walls, wherein the rear wall is attachable to a secure container;

a source of power;

a rotatable dial positioned on the front of the housing, said dial configured to activate said source of power upon a clockwise or counter-clockwise rotation, said dial configured to input a user input code comprising a first, second and third user input two digit character into said electronic lock;

a top-reading display having a display portion for displaying a first, second and third randomly generated two-digit characters and said first, second and third user input two digit character; and a microprocessor having memory for storing said user input code and a valid access code, said microprocessor operably coupled to said electronic lock and configured to (i) upon activation by said source of power randomly generate said first randomly generated two-digit character and display said first randomly generated two digit character in the top-reading display; (ii) after a first pre-determined period of time after a user enters the first user input two digit character storing the first user input two digit characters in memory and generating the second randomly generated two digit character, which is displayed in the display thereby automatically preventing changing the first user two-digit input character after the second two-digit random character displays in the display; (iii) after a second pre-determined period of time after the user enters the second user input two digit character, storing the second user input two digit character in memory and generating the third randomly generated two digit character, which is displayed in the display thereby automatically preventing changing the second user two-digit input character after the third two-digit random character displays in the display; (iv) after a third pre-determined period of time after a user enters the third user input two digit character, storing the third user input two digit character in memory thereby automatically preventing changing the third user two-digit input character after the third pre-determined period of time, and (v) comparing the first, second and third user input two digit characters to the stored valid access code and determining whether the first, second and third user inputted two digit characters match the stored valid access code, said microprocessor configured to control operation of a locking mechanism, wherein the locking mechanism is movable from a locked position to an unlocked position upon the microprocessor determining that the user input code matches the stored valid access code.

11. The electronic lock of claim 10, wherein the first, second and third user input two digit characters and the first, second and third randomly generated characters are alphanumeric characters.

12. The electronic lock of claim 11, wherein the alphanumeric characters are integers.

13. The electronic lock of claim 12, wherein the integers are in a range from 0 through 9.

14. The electronic lock of claim 12, wherein the integers are two-digit integers.

15. The electronic lock of claim 10 wherein the valid access code comprises a three character code, each character including two digits.

* * * * *